July 28, 1942.  J. H. CHURCH  2,290,864
RANGE FINDER
Filed Sept. 20, 1941
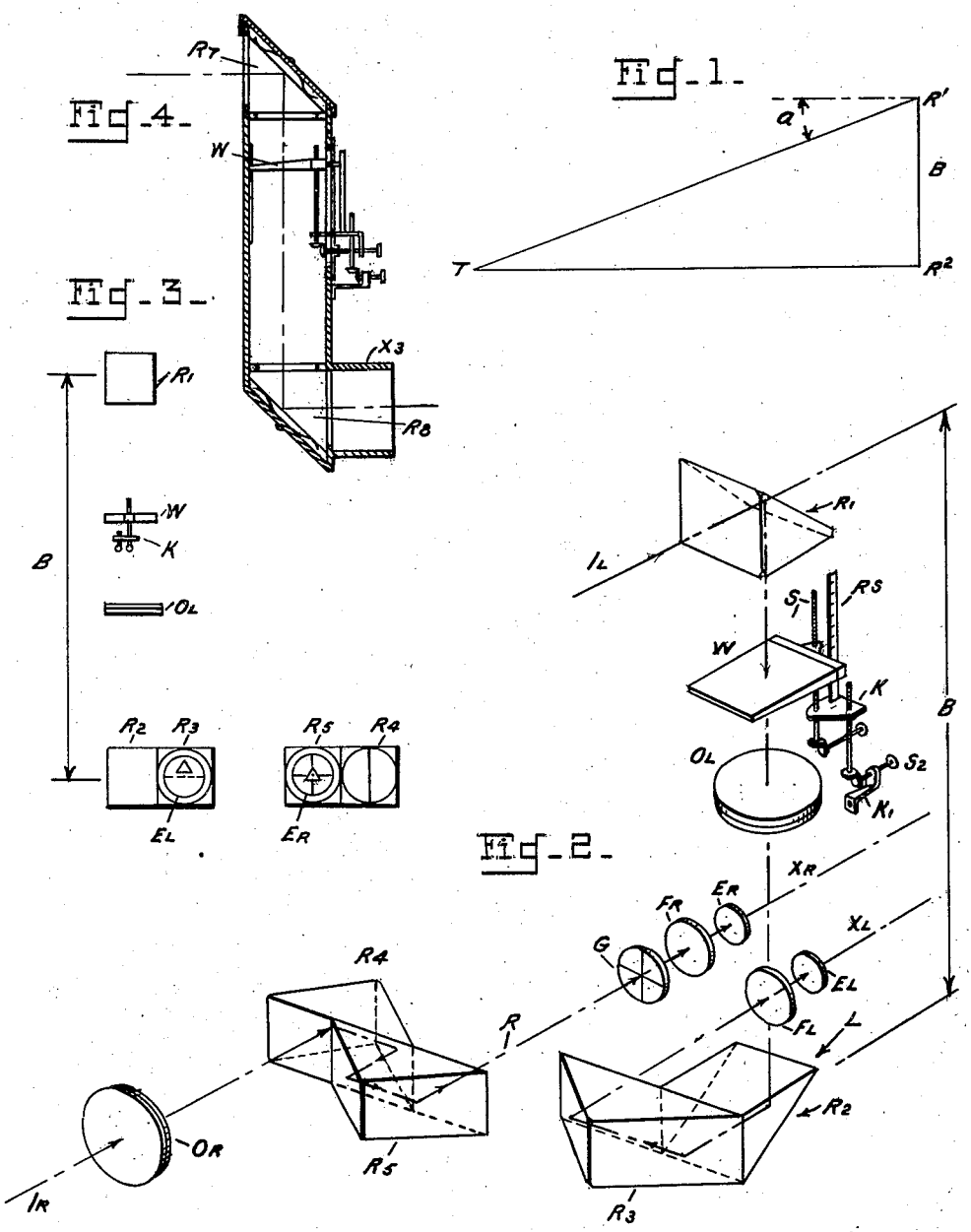
Inventor
Joseph H. Church Patented July 28, 1942

2,290,864

UNITED STATES PATENT OFFICE 2,290,864

RANGE FINDER

Joseph H. Church, Austin, Minn.

Application September 20, 1941, Serial No. 411,627

1 Claim. (Cl. 88—2.7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a range finder, and is a continuation in part of my co-pending application, Serial No. 381,055, filed February 28, 1941.

A principal object of the present invention is to provide a stereobinocular range finder so arranged as to utilize fusion of the target or object images formed by the two telescopic systems thereof as an indication to the observer that the range determining triangle, which the range finder is designed to solve, is closed upon said target or object to which the distance or range from the range finder is sought.

A further object of the invention is to provide a stereobinocular range finder designed in such manner that the target or object images formed by the two telescopic systems will be vertically displaced relative to each other proportional to the range of the target or object from the range finder, whereby; vertical displacement of the image in one of the telescopic systems for the purpose of accomplishing fusion of the images of both systems may be used as a measure proportional to said range.

Still another object of the invention is to provide a range finder especially suitable for attachment to a gun or its mount for use by the gunner in determining range to a target without entailing any substantial difference in operation as compared with the operation of training a conventional optical sight upon the target.

Another object of the invention is to provide an attachment adapted to be used with the ordinary binoculars for range finding purposes.

The specific nature of the invention as well as other objects and advantages thereof will clearly appear from a description of a preferred embodiment as shown in the accompanying drawing in which:

Fig. 1 is a view showing the range determining triangle solved by the range finder of this invention;

Fig. 2 is a perspective of the telescopic systems of the stereobinocular range finder used for solving the range determining triangle of Fig. 1;

Fig. 3 is a rear elevation of the telescopic systems shown in Fig. 2;

Fig. 4 shows an attachment for a conventional pair of binoculars embodying the principles of this invention.

Referring now to the drawing and more particularly to Fig. 2 there is shown a pair of telescope systems generally indicated at L and R, respectively, arranged in accordance with the binocular range finder of this invention.

The telescope system L comprises an upper reflector $R_1$ having its reflecting surface disposed at forty-five degrees to the horizontal, a lower reflector $R_2$ vertically aligned with and disposed a known distance B below reflector $R_1$ with its reflecting surface arranged at ninety degrees relative to reflector $R_1$, and a compound reflector $R_3$; the reflectors all being so relatively disposed as to cause a horizontal ray of light $I_1$ incident upon the reflector $R_1$ to take the path indicated in Fig. 2 emerging at $X_L$. An objective $O_L$ is interposed between the reflectors $R_1$ and $R_2$, although it will be understood that the objective may precede the reflector $R_1$ in the system if preferred.

The system is completed by the field lens $F_L$ and eye lens $E_L$.

To cause rays of light $I_L$ other than those which are horizontally incident upon reflector $R_1$ to pursue the same path as the emergent ray $X_L$ of a horizontal incident ray $I_L$ there is provided a thin refracting or measuring wedge W which is interposed between the reflector $R_1$ and objective $O_L$ in a vertically movable manner by the screw or equivalent device $S_1$ journaled in the bracket K adjustably supported by the adjusting device $S_2$ mounted in the fixed bracket $K_1$. Thus it will be seen that the wedge W may be vertically adjusted to cause all rays $I_L$ incident upon reflector $R_1$ which deviate from the horizontal by small angles to emerge in a path coincident with the emergent ray $X_L$ of a horizontal incident ray upon reflector $R_1$. If preferred a compensating wedge unit may be substituted for the translatory wedge as is well known in the art.

A suitably graduated range scale RS may be mounted on the bracket K to indicate in terms of range or distance the vertical displacement of wedge W from a normal zero position.

The telescopic system generally indicated at R comprises an objective $O_R$, a pair of compound reflectors $R_4$, $R_5$, reticule G and field and eye lens $F_R$, $E_R$ so arranged to cause a horizontal incident ray $I_R$ to emerge in a path $X_R$ contained in the same plane as and parallel to emergent ray path $X_L$. It is preferred to use the reflectors $R_4$, $R_5$ although it will be understood by those skilled in the art that such reflectors may be omitted if desired.

The telescopic systems shown in Fig. 2 will be enclosed in any suitable light proof housing members provided with the necessary entrance and exit openings, but which do not form any part of the present invention and are therefore omitted from the drawing for the sake of clarity.

It is contemplated that when the device is to be used on a gun that the telescopic system R will be mounted either on the gun or gun mount in such fashion that the axis of objective $O_R$ will be located in the vertical plane containing the axis of the bore of the gun and be parallel thereto, with the axis of objective $O_L$ disposed in the vertical plane.

The range triangle solved by the instrument is shown in Fig. 1 and is a plane right triangle $R^1$, $R^2$, T having a known base B from which the range or distance $R_2$—T may be determined by measuring the angle $a$ between $R^1$—T and a line parallel to the target or object line $R^2$—T. As will be noted by comparison with Fig. 2, the points $R^1$, $R^2$ correspond with the reflectors $R_1$, $R_2$, respectively, and the wedge W will measure the deviation $a$ of a line $R^1$—T corresponding to an incident ray $I_L$ that is incident upon reflector $R_1$ in other than horizontal relation.

In operation the range finder is trained so that the target will be observed in the telescopic system R in centered relation to reticule G which will produce an image in the eye piece $E_R$ shown in the form of a triangle in Fig. 3 for the purpose of illustration. With the telescopic system R trained as above indicated on a finite target a ray of light from the target will also be incident upon reflector $R^1$ at some angle of deviation $a$ from the horizontal which will traverse the telescopic system L and form an image in eye piece $E_L$ above the image formed in eye piece $E_R$ as indicated in Fig. 3, thereby forming double images of the target to the observer. In order for the observer to see one stereoscopic image of the target the image in the telescopic system L must be brought into horizontal alignment with the image formed by the telescopic system R which is done by movement of the wedge W through screw $S_1$ to refract the imaging rays of the target incident upon reflector $R_1$ to the vertical which makes them emerge in the horizontal path $X_L$. When the imaging rays from both telescopic systems emerge in paths coincident with the path $X_L$ $X_R$ the images will be horizontally aligned by vertical displacement of the image in telescopic system L and stereoscopic fusion will be accomplished by the observer indicating to him that the triangle $R^1$, $R^2$ T is closed on the target T and that the wedge W is adjusted to properly measure angle $a$ which may be read from scale RS in terms of range or distance.

To adjust the range finder a suitable adjusting lath provided with parallel measuring marks separated a distance B may be placed before objective $O_R$ and reflector $R_1$ in such manner that the horizontal cross hair of the reticule G will coincide with the lower mark in which case the upper mark before reflector $R_1$ should coincide with the lower mark as seen in eye pieces $E_L$, $E_R$. If the two marks do not fuse for the infinity setting of the wedge W then the wedge W, bracket K and scale RS may be bodily adjusted by screw $S_2$ until the two marks do properly coincide. The same infinity adjustment may be accomplished by observing a body at infinite distance as is well known in the art.

While the telescopic system L is shown as including the base B it is of course to be understood that the two telescopic systems L, R may be relatively reversed if desired.

In Fig. 4 is shown an attachment suitable for converting a pair of ordinary binoculars into a stereobinocular range finder of the type herein disclosed. The attachment comprises upper and lower reflectors $R_7$, $R_8$ having their reflecting surfaces arranged in parallel vertically spaced and aligned relation, herein shown as being separated a distance B as in Fig. 3. The deflectors $R_7$, $R_8$ are fixed in a suitable casing having a lower tubular exit member adapted to be attached to the objective piece of a conventional pair of binoculars. The attachment has an adjustable wedge W, and adjustment mechanism similar to that shown in Fig. 2 for a similar purpose. The attachment after being secured to the binoculars is used in the same manner as the device shown in Fig. 3.

I claim:

In a stereobinocular range finder, a pair of telescopic systems arranged to image an object at a finite distance from points vertically spaced a known distance in vertically spaced relation in the eye pieces of said systems proportional to the distance of said object, refracting wedge means interposed between said vertically spaced points for vertically displacing the image formed in one of said eye pieces into horizontal alignment with the image formed in the other eye piece, and means for measuring the vertical displacement of said one image; whereby said images may be stereoscopically fused by an observer to determine the range of said object, said wedge means comprising means for adjusting the wedge vertically including an adjustable support for mounting the wedge adjusting means, a range scale mounted on the adjustable support for indicating movement of the wedge and means for vertically adjusting the adjustable support.

JOSEPH H. CHURCH.